Aug. 26, 1941.     D. S. BRUCE     2,253,608

FRICTION ELEMENT

Filed Dec. 2, 1936

INVENTOR
Donald S. Bruce.
BY Virgil E. Kline
ATTORNEY

Patented Aug. 26, 1941

2,253,608

UNITED STATES PATENT OFFICE 2,253,608

FRICTION ELEMENT

Donald S. Bruce, Somerville, N. J., assignor to Johns-Manville Corporation, New York, N. Y., a corporation of New York Application December 2, 1936, Serial No. 113,765

3 Claims. (Cl. 106—36)

The invention relates to a friction element, and more particularly to a brake lining, clutch facing, or the like, of improved coefficient of friction and wear-resistance.

It is an object of the invention to provide a brake lining having adequate strength, high coefficient of friction and high resistance to wear during use. Other objects and advantages will appear from the following description.

The invention comprises the novel features of the product herein described, including a friction element containing a matrix of friction material with granules having a hardness of the order of that of brass embedded therein and in unrestricted contact therewith. The invention comprises, also, such a friction element containing, in addition, granules of somewhat softer material alternating with the harder granules of kind stated.

The embodiment of the invention selected for the purpose of illustration is shown in the accompanying drawing, and the invention will be exemplified by description in connection therewith.

Figure 1:
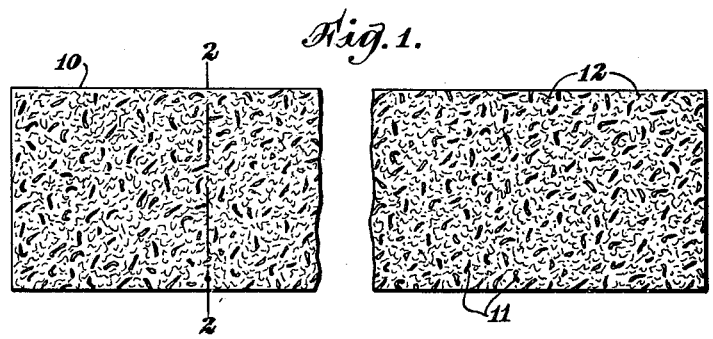
Fig. 1 is a face view of a brake lining constructed in accordance with the invention.
Figure 2:
Fig. 2 is a cross sectional view on line 2—2 of Fig. 1.
Figure 3:
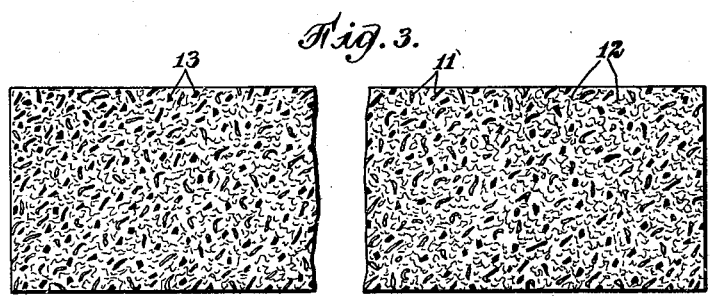
Fig. 3 is a face view of a modification of the invention.

In the drawing, there is shown a friction material 10 that is semi-rigid and adapted, therefore, to maintain in approximately pre-established position the granules 11 that are embedded in the compound in discrete and relatively closely spaced relationship to each other.

A friction material that I have used to advantage is one containing a rubber friction compound and reenforcing fibres 12 of asbestos or the like intimately associated therewith, as by dispersion therein or impregnation therewith. Another friction material that may be used is one containing polymerized chloroprene of rubbery consistency, intimately mixed with asbestos fibres and with fillers and admixtures that are commonly used in the compounding of chloroprene compositions for use as friction material. The friction material is preferably moderately resilient.

As the composition of the granules 11, I prefer to use small granules of brass, say in the form of turnings or shavings of size of the order of particles which may be passed approximately completely through a 14-mesh screen and retained on a 65-mesh screen. The size of the grains is exaggerated in the figures. These granules of brass, in the finished friction element, contact directly and in unrestricted manner with the friction compound, in distinction from the nature of the contact when the brass used is in the form of wire-reenforced asbestos yarn, for instance. Preferably, the granules of brass are provided with irregularities of surface into which the friction compound extends, to give a keying effect increasing the firmness of holding of the granules of brass on the wearing surface of the friction element.

The friction compound may contain a resin, say, a phenol-aldehyde condensation product or the like. Such resin is preferably used in addition to such a binder as rubber or chloroprene, as a modifier therefor.

The compound, apparatus and method used in making my improved friction element may be those described in U. S. Patent 1,771,749 issued to Eisenhardt on July 29, 1930, modified as described herein. Thus, there may be formed an intimate mixture including the selected friction compound, asbestos fibres, granules, and volatile solvent or extender for the said compound, the mixture formed into a sheet on a roller of the machine described by Eisenhardt, commonly known as a sheeter, and the sheet then finished and shaped into the friction element by the steps described, including volatilization of the solvent and hardening of the product, as at an elevated temperature and as by vulcanization in case a rubber friction compound has been used.

The proportion of the brass granules that are used may be varied within limits.

Using about 17 parts by weight of brass to 83 parts of friction material (including the asbestos fibres), I have found a substantial increase in the coefficient of friction, as compared to the coefficient of friction of the same material without brass. Also, I have found that the rate of wear of the friction element is decreased to approximately one-half or less of the rate when the brass is not included.

Increasing the proportion of brass above the 17 parts mentioned would increase further the resistance to wear while a smaller proportion of brass may be used, if a higher rate of wear is not objectionable. On the whole, I prefer to use brass in the proportion of about 5 to 25 parts by weight to 100 parts of the friction compound.

A brass that I have used to advantage is one that has been annealed in a standard continuous annealing furnace and method and that contains about 60 parts of copper by weight, 38 of zinc, and 2 of lead. It is a forging brass.

While brass has been found to be particularly desirable as the material of composition of the granules, there may be used, for some purposes, granules of other material of hardness of the order of that of brass at the maximum temperature of use of the friction element. Such materials are those that do not melt at the said temperature or are not so hard as to score the brake drum badly. Thus, there may be used granules of hardness, at ordinary temperatures, of about 2 to 4 and, preferably, about 2.5 to 3.5 in the scale of hardness, such as Mohs' scale, in which rock salt is taken as 2, fluorite as 4, and the diamond as 10. Other materials that may be used in place of the brass include copper and various alloys of the general properties described.

For some purposes, it is desired to have in the friction element not only granules of the kind described but also softer granules 13 interspersed therewith, in generally alternating relationship.

Thus I may use granules of a rubber friction compound in precured condition. Such granules may be made by forming a rubber compound of chosen composition, as, for example, on rubber mixing rolls, shaping the compound into a thin sheet, say, about $\frac{1}{16}$" thick, curing the thus sheeted material, cooling the product, and granulating it. Curing conditions should be such as to give a product that is soft at a temperature of about 270° F. but brittle when cold and that is substantially insoluble in the solvent such as gasoline that is used in making the mixture described above. Such curing may be effected at a temperature of 300° F., for a period of approximately three hours, in a drying oven. The cured material is allowed to cool and is then granulated, as by being ground in a suitable grinder, such as a hammer mill. The granulated material is then screened to proper size. The size of granules selected will depend, in part, upon the conditions under which the granules are to be incorporated into the friction material and upon the particular structure desired. For the best results, I have used granules of size 10-mesh or finer and coarser than 60-mesh, consisting of friction compound exclusively.

For these softer granules, I may use material other than that described in my said application of about the hardness, at the temperature of use of the friction element, of a good grade of anthracite or cannel coal, although granules of semibituminous or of bituminous coal may be selected when it is desired to have slightly softer granules.

These additional granules are of about the same mesh sizes and may be incorporated in about the same proportion as described in the case of the brass-like or metal particles. When such softer granules are used, the granules of brass or the like may be omitted if their function is not desired. However, the combination including the two kinds of granules gives material of unusual merit.

It will be understood that the granules 13 are subjected to a temperature of about 300 to 450° F. during the curing of the friction element.

The improved friction element is not only outstanding in its frictional characteristics, including resistance to being worn away, but also is economical to manufacture and has a particularly desirable coefficient of friction at the temperatures of use under severe conditions. Whereas many brake linings show fading at high temperatures, apparently due to heat-softening of the composition on the wearing surface, specimens of brake lining of my improved kind have actually shown a slight increase in coefficient of friction with rise in temperature of the wearing surface.

Figure 4:
Fig. 4 is a cross sectional view of another modification of the invention.

When it is desired to combine the desirable properties of the wearing surface described with overall high strength, there may be used a friction element of the type shown in Fig. 4.

This friction element includes a strong back portion 14, a face portion 15 of the kind described, as, for example, one containing the embedded granules 11 and 13, and, preferably, also, an intermediate layer 16 integrally uniting together the face and back portions.

Such a composite product may be made on the sheeter machine described in the said Eisenhardt patent. Thus, there may be formed a mixture of the kind described by Eisenhardt but including preferably a relatively large proportion of asbestos fibres, say 50 to 75 parts by weight to 50 to 25 parts of the rubber compound or the like. There is then transferred to the machine sufficient of this mixture to form a tube of thickness of wall at least approximately equal to the thickness desired for the backing portion 14. This mixture is then formed into a sheet on a roller of the sheeter machine, by compositing a plurality of individually, thin plastic laminae of the mixture, in accordance with the method of Eisenhardt. When the back portion has been thus formed, then there is charged to the sheeter machine the composition that is to provide the face portion. This material is then sheeted directly upon the originally sheeted material, so that the resulting product is a composite of a plurality of thin plastic laminae of the two kinds of materials.

Preferably, there is used of the material of the back portion slightly more than is sheeted into that portion, the small amount remaining being left on the sheeter machine in unsheeted condition; when the stock is later added to form the face portion, there is delivered to the sheeter, for a short period, a blend or intermixture of the materials of the face and back portions. The result is the intermediate bonding layer 16, which eliminates abruptness of change of composition between the back and face portions of the lining.

In making the brake lining of the kind illustrated in Fig. 4 and described in connection therewith, there is used usual admixtures and ingredients such as fillers and volatile solvent, and the product is finished into friction elements by steps including the evaporation of the solvent, and hardening and shaping of the product to the exact form desired.

The details given are for the purpose of illustration, not restriction, and variations within the spirit of the invention are intended to be included in the scope of the appended claims.

What I claim is:

1. A friction element comprising a friction material, brass granules, granules of an organic carbonaceous substance the hardness of said substance being between 2 and 3 on Mohs' scale of hardness at the temperature of the use of the friction element, the granules of the two kinds being embedded in said material in generally alternating relationship with one another.

2. A friction element comprising a semi-rigid friction material, brass granules, granules of hard rubber compound, the granules of the two kinds being embedded in said binder in generally alternating relationship with one another.

3. A friction element comprising a semi-rigid friction material, granules of brass, granules of hard rubber compound, asbestos fibres, the asbestos fibres being substantially parallel to the plane surface of said material and being substantially longitudinal with the length of said material, the granules of the two kinds being embedded in the said material in generally alternating relationship with one another and being in direct and unrestricted contact with said material.

DONALD S. BRUCE.